(12) United States Patent
Sullivan (10) Patent No.: US 10,492,513 B1
(45) Date of Patent: Dec. 3, 2019

(54) AUTOMATED BEVERAGE DISPENSING SYSTEM AND METHOD

(71) Applicant: Robert M. Sullivan, Cocoa Beach, FL (US)

(72) Inventor: Robert M. Sullivan, Cocoa Beach, FL (US)

( * ) Notice: Subject to any disclaimer, the term of this patent is extended or adjusted under 35 U.S.C. 154(b) by 562 days.

(21) Appl. No.: 15/132,214

(22) Filed: Apr. 18, 2016

Related U.S. Application Data

(60) Provisional application No. 62/149,055, filed on Apr. 17, 2015.

(51) Int. Cl.
| | | |
|---|---|---|
| *A23G 9/00* | (2006.01) |
| *A23G 9/04* | (2006.01) |
| *A23G 9/28* | (2006.01) |
| *B02C 23/02* | (2006.01) |
| *B01F 13/10* | (2006.01) |
| *B01F 15/00* | (2006.01) |

(52) U.S. Cl.
CPC .............. *A23G 9/045* (2013.01); *A23G 9/28* (2013.01); *B01F 13/1055* (2013.01); *B01F 13/1066* (2013.01); *B01F 15/00025* (2013.01); *B02C 23/02* (2013.01); *B01F 2215/0022* (2013.01)

(58) Field of Classification Search
CPC .......... A23G 9/281; A23G 9/045; A23G 9/28; A23G 9/30; B01F 13/1055; B01F 13/1066; B01F 15/00025; B01F 2215/0022; A47J 31/60; A47J 31/4407; A47J 27/08; A47J 36/10; B67D 1/07; F25D 11/02; F25C 5/12
See application file for complete search history.

(56) References Cited

U.S. PATENT DOCUMENTS

| | | | | |
|---|---|---|---|---|
| 7,083,071 | B1 * | 8/2006 | Crisp, III ............. | B67D 1/0021 222/129.3 |
| 9,155,330 | B1 * | 10/2015 | Shtivelman ............. | A47J 31/60 |
| 2003/0085237 | A1 * | 5/2003 | Kateman ................ | A23G 9/045 222/1 |
| 2004/0154316 | A1 * | 8/2004 | Kateman ................ | A23G 9/08 62/60 |
| 2016/0270423 | A1 * | 9/2016 | Sherman ................ | C12G 3/005 |

* cited by examiner

*Primary Examiner* — Henry T Crenshaw
*Assistant Examiner* — Kamran Tavakoldavani
(74) *Attorney, Agent, or Firm* — Underwood & Associates, LLC (57) ABSTRACT

An automated beverage-making system includes one or more ingredient dispenser assemblies configured to store ingredients therein and disposed within a refrigerator/freezer system. Each of the ingredient dispenser assembles are in control communication with a communications hub and the communications hub is configured to receive instructions for actuating the one or more ingredient dispenser assemblies according to a recipe, wherein the ingredients are combined in a blender.

20 Claims, 5 Drawing Sheets

AUTOMATED BEVERAGE DISPENSING SYSTEM AND METHOD

CROSS REFERENCE TO RELATED APPLICATIONS

This application claims priority to and the benefit under 35 USC § 119(e) of U.S. Provisional Patent Application No. 62/149,055, filed on Apr. 17, 2015, the contents of which are incorporated by reference in their entirety as if fully set forth herein.

TECHNICAL FIELD

This disclosure relates to systems and methods for creating beverages from a cache of stored ingredients. In particular, this disclosure relates to an automated, self-cleaning beverage-making system configured to blend selected ingredients together to form a beverage product. In a preferred embodiment, an automated smoothie-making system is provided wherein a cache of smoothie ingredients is stored in a refrigerator, freezer, or both and the system is further configured for communication with an external device to provide on-demand creation of a smoothie product.

BACKGROUND

Mixed beverages are well-known throughout the food industry. In particular, so-called 'smoothies'—generally including a blended mixture of one or more of water, juice, ice, ice cream, frozen yogurt, fruits or supplements—represent an approximately $2 billion market in the United States alone.

Some people enjoy smoothies because they can be a nutritional alternative to less-healthy choices such as shakes and sodas. Smoothies can be created from any desired ingredients; however, they are generally served as a cold, blended product, usually containing fresh fruits and other healthy foods. Out of convenience, consumers may be more motivated to purchase a smoothie from a vendor than purchase a blender, store ingredients in their kitchens, and go through the process of making a smoothie themselves. This approach, however, has its drawbacks in that store-bought smoothies can be expensive and requires persons to travel to a vendor or franchise.

Thus, a need exists for a system capable of storing smoothie ingredients in a cold environment to keep ingredients fresh, which also provides automated blending of selected ingredients according to one or more stored recipes, and a dispenser system that, in cooperation provides consumers the ability to formulate smoothies conveniently at home at a time of their choosing.

SUMMARY

In one exemplary aspect, an automated, self-cleaning system is disclosed that provides mixed beverages such as smoothies from a cache of ingredients held in one or more ingredient containers. The system includes the ingredient containers in dispensing communication with a blender which mixes the ingredients in pre-determined proportions according to one or more electronically-stored recipes. An automated cup handling assembly places a cup in proper position to receive mixed beverage contents from the blender so that it can be accessed by a user. In a preferred embodiment, the components of the automated system are disposed within a housing configured to couple with the inside of a freezer door, a refrigerator door, or both. A software application is operably configured to control aspects of the automated system.

In another exemplary aspect, an automated beverage-making system is disclosed. The automated beverage-making system includes a partition having an aperture between a freezer section and a refrigerator section beneath the freezer section, at least one ingredient container for storing one or more ingredients disposed within the freezer section, each ingredient container including an actuatable ingredient dispenser configured to dispense a quantity of the one or more ingredients, and a blender disposed within the refrigerator section configured to receive the one or more ingredients, blend the one or more ingredients to form a drink mixture, and dispense the drink mixture into a drinking container.

In one embodiment, the at least one ingredient container is configured to dispense the one or more ingredients through the partition aperture.

In one embodiment, the freezer section includes a plurality of the ingredient dispensers configured to store frozen food ingredients. In a related embodiment, the automated beverage-making system further includes a chute assembly configured to transport ingredients dispensed from any of the ingredient dispensers to the partition aperture.

In one embodiment, the automated beverage-making system further includes one or more ingredient containers disposed in the refrigerator section, each having an ingredient dispenser operably coupled thereto to dispense a quantity of ingredient stored therein, and an ingredient conduit configured to carry the dispensed quantity of the ingredient to the blender.

In one embodiment, the automated beverage-making system further includes a communications hub. The communications hub includes at least a processor and a memory configured to control the actuatable ingredient dispenser according to stored logic instructions. In a related embodiment, the communications hub is configured to receive command and control signals from a remote computing device for creating the drink mixture according to a recipe. In yet another related embodiment, the quantity of the ingredient is dispensed according to a pre-defined drink mixture recipe.

In one embodiment, the blender is rotatable about an axis between an ingredient-filling position, a dispensing position and a washing position. In a related embodiment, the automated beverage-making system further includes a nozzle assembly plumbed to a wash solution and a catch basin plumbed to a drain. When the blender is in the washing position, the nozzle assembly is configured to spray the wash solution into the blender, and the catch basin is configured to catch the discard.

In one embodiment, the blender includes a top portion. The top portion includes at least one hingedly-coupled door member configured to shift between open-blender and closed-blender configurations. In an alternative embodiment, the blender top portion includes a plurality of hingedly-coupled door members. In yet another related embodiment, the automated beverage-making system further includes a shaft member configured to be shifted between extended and retracted positions, a hingedly-coupled scissor-arm assembly coupled to the shaft member and a bale member coupled to the scissor-arm assembly and a flange member of the door member. In this embodiment, shifting of the shaft in an upward direction causes opposite ends of the scissor-arm assembly to correspondingly shift downward; this correspondingly urges the door member to shift to the open-blender configuration.

In one embodiment, the at least one ingredient container of the freezer section is disposed on a door of the freezer section. In a related embodiment, the blender is disposed on a door of the refrigerator section.

In yet another exemplary aspect, an automated smoothie-making machine is disclosed. The automated smoothie-making machine includes at least one ingredient container for storing one or more ingredients disposed in each of a freezer and refrigerator section, respectively. Each ingredient container includes a dispensing assembly for dispensing a selected amount of each ingredient container's ingredients, respectively. The automated smoothie-making machine is further operably configured to combine dispensed ingredients from the freezer section and the refrigerator sections into a blender and blend the combined ingredients to form a smoothie drink product.

In one embodiment, the automated smoothie-making machine is further operably configured to automatically wash the interior portion of the blender after a smoothie drink product has been made therein.

In one embodiment, the automated smoothie-making machine is further operably configured to mechanistically open and close first and second doors hingedly disposed on a top portion of the blender.

In yet another exemplary aspect, an automated smoothie-making system is disclosed. The automated smoothie-making system includes a partition disposed between an upper freezer portion and a lower refrigerator portion, wherein the partition includes an aperture. The automated smoothie-making system further includes a plurality of ingredient containers for storing smoothie ingredients disposed within the freezer and the refrigerator portions, and a blender disposed subjacent to the aperture that is configured to blend the smoothie ingredients into a smoothie drink mixture. In this embodiment, each of the ingredient containers in the freezer section is configured to dispense ingredients into a collection chute leading to the aperture. Furthermore, a top portion of the blender includes a plurality of door members operably configured to shift between open and closed positions to receive and blend the ingredients, respectively. In this embodiment, the blender is configured to rotate between ingredient-receiving and blending, smoothie drink mixture dispensing and blender washing orientations.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

The foregoing summary is illustrative only and is not intended to be in any way limiting. In addition to the illustrative aspects, embodiments, and features described above, further aspects, embodiments, and features will become apparent by reference to the drawings and the following detailed description and claims.

DESCRIPTION OF DRAWINGS

The present embodiments are illustrated by way of the figures of the accompanying drawings, which may not necessarily be to scale, in which like references indicate similar elements, and in which.

DETAILED DESCRIPTION OF ILLUSTRATIVE EMBODIMENTS

In general, an automated beverage dispensing system is disclosed. In the description that follows, the automated beverage dispensing system is described as being configured to make smoothie drinks, which are generally known to include one or more blended fruits, vegetables, vitamins, supplements, yogurt, alcohol, ice or other ingredients into a smooth, cold beverage. It should be understood, however, that the details of the various systems and embodiments described herein can be modified or adapted as desired to make other kinds of beverages and is not limited to smoothies in particular. Furthermore, while certain ingredients, ingredient containers, plumbing, and other elements of the dispensing system are described, including computer processor-implemented functionality, it should be understood that those aspects, too can be modified or adapted as desired to achieve certain desired results. Therefore, the following description is but one of many possible embodiments, and is non-limiting with respect to the claims.

In one exemplary aspect, an automated beverage system includes a plurality of removable containers for storing chosen ingredients; a water source; an ice source; a cache of beverage containers; an ingredient-blending system and a dispenser system. In a preferred embodiment, the aforementioned elements are integrated with a freezer/refrigerator system, e.g., one which is commonly used in households. In this exemplary aspect, the system furthermore includes an electronic communications hub operable to send and receive signals related to the automated production of beverages to and from a control application. The control application can reside on a control panel directly integrated with the dispensing system, or be a network-enabled application executable on, e.g., a smart phone or other personal computing device, or both. Furthermore, the system can include an application user interface configured to send and receive signals to and from a computer network so as to engender bidirectional signal communication to and from the communications hub and a personal computing device such as a mobile phone. As used herein, personal computing devices can include any kind of computing device, including, but not limited to mobile devices, e.g., cellular phones, tablets, PDA's, laptop and desktop personal computers and other devices having components for sending and receiving communication signals directly, e.g., using BLUETOOTH or WiFi, or over a network such as the internet or an intranet, or both.

Figure 1:
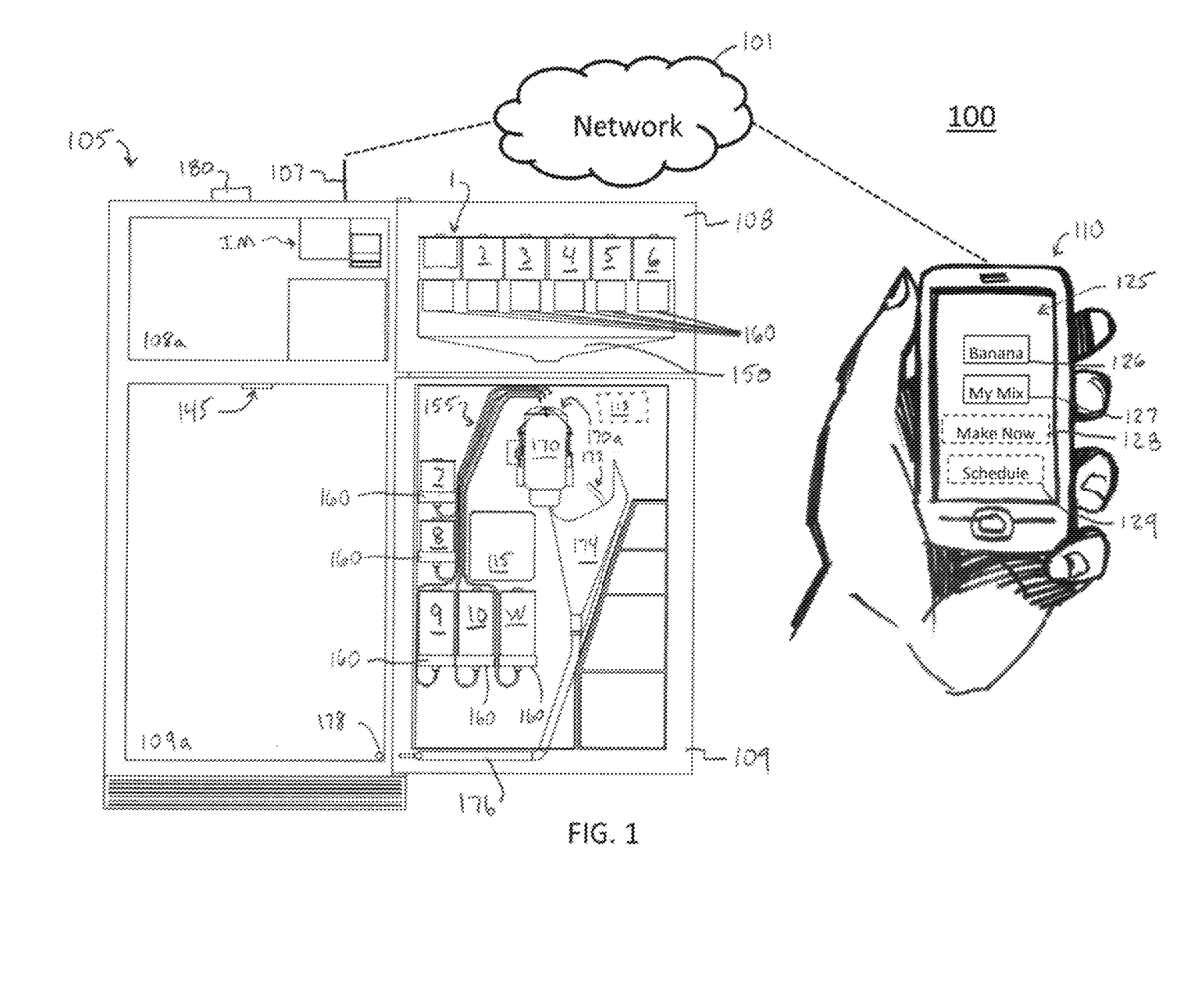
FIG. 1 illustrates an automated smoothie-making system according to one embodiment.

Referring now to FIG. 1, an automated smoothie-making system (hereinafter SMS) 100 is illustrated according to one embodiment. In this embodiment, the SMS 100 includes an ingredient storage, blending and serving assembly (BSA) 105 which, in this embodiment is operably integrated with a refrigerator/freezer system similar to those appliances available at many household goods stores. BSA 105 includes a communications hub 180 (described in greater detail below) which is configured for bi-directional signal communication with network 101 via wireless antenna 107. BSA 105 includes an upper freezer portion 108a and a lower refrigerator portion 109a as is common in household combination refrigerator/freezer systems, each having a door 108, 109, respectively. Refrigerator 109 includes a dispenser housing 115 accessible from an exterior side (not visible in FIG. 1).

In this embodiment, the BSA 105 can be controlled by integral control panel 113 or a remote mobile device 110 capable of executing software instructions to cause the BSA 105 to perform functions relating to smoothie-making, serving and cleaning of certain components as described herein. FIG. 1 shows an exemplary application interface 125 configured to cause the BSA 105 to produce a desired beverage. In this example, the interface 125 includes action areas that, when pressed cause appropriate signals to be sent to the communications hub over network 101 which cause a desired beverage to be made by the BSA 105. In this example, the interface 125 includes a first action area 126 for a banana smoothie and section action area 127 for a "My Mix" smoothie. Activating either control area, e.g., by touch, can cause control signals to be transmitted via network 101 to communications hub 180; communications hub 180 can then activate various controls, dispensers, actuators and other features to create a blended drink product as described in greater detail herein.

The BSA 105 includes a plurality of storage containers, each configured to store ingredients of the user's choice and dispense selected quantities of the ingredients into a mixer, as described in greater detail below. Activating a control area, e.g., by pressing the "Banana" and "Make Now" buttons, can cause one or more of the stored ingredients to be dispensed according to recipe proportions and mixed together to create a smoothie product. In this example, the interface 125 includes a "Make Now" action area 128 and a "Schedule" action area 129 which, when pressed, can cause either the immediate execution of commands to make the selected smoothie type instantly, or bring up a subsequent interface to schedule the selected smoothie to be made at a later time and/or date. It should be understood that interface 125 illustrates only a portion of the available functionality of an application configured for communication with the BSA 105.

Figure 2:
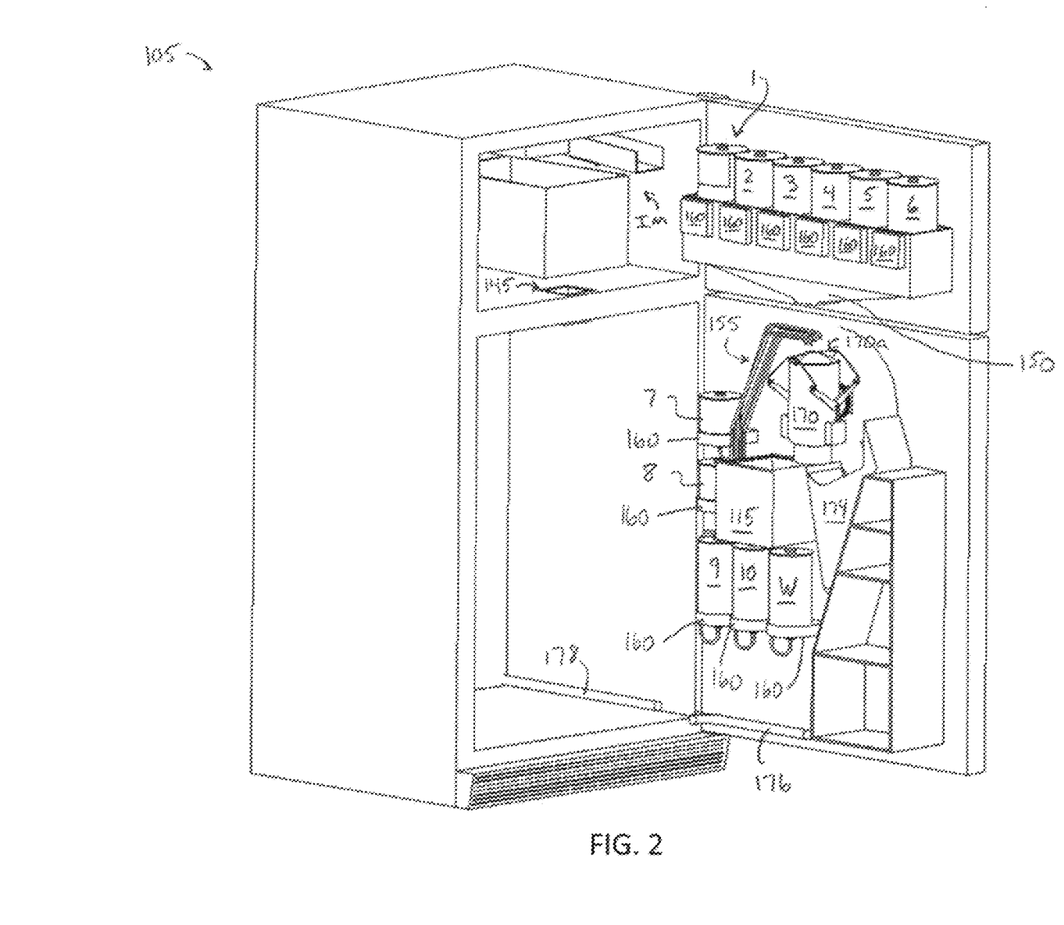
FIG. 2 illustrates an isometric view of a blending and serving assembly of a automated smoothie-making system according to one embodiment.
Figure 2A:
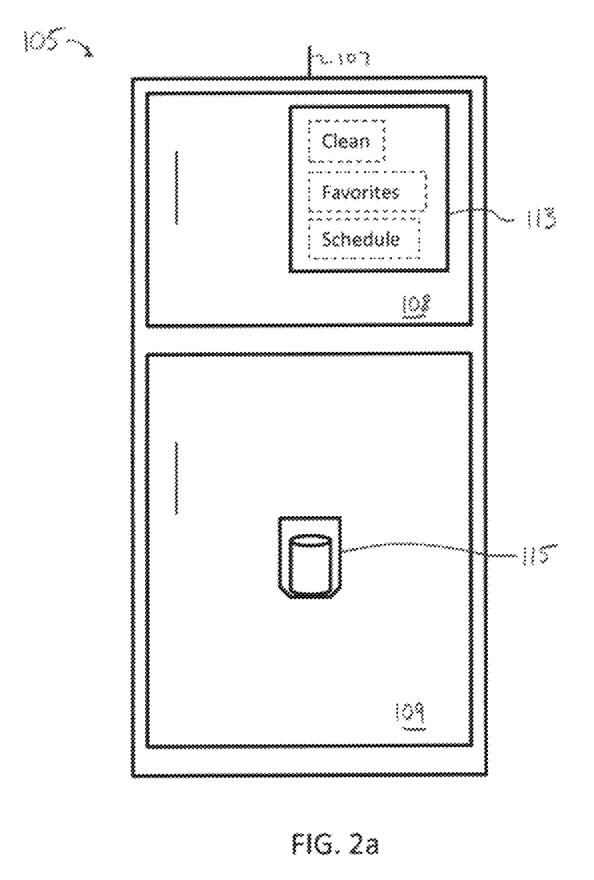
FIG. 2A illustrates a front elevation view of a blending and serving assembly of an automated smoothie-making system, according to one embodiment.

FIG. 2 illustrates BSA 105 in an isometric view with freezer (108) and refrigerator (109) doors in an open configuration to show elements of the blending and serving assembly, according to one embodiment. FIG. 2A shows a front-elevation view of BSA 105 with the freezer (108) and refrigerator (109) doors in a closed configuration illustrating, inter alia, an exteriorly-accessible dispenser housing 115 where finished smoothie products are dispensed, according to one embodiment.

Referring to FIGS. 1 and 2, in this embodiment, the BSA 105 includes a plurality of frozen ingredient containers 1-6 disposed within an interior housing of freezer door 108. The interior housing is not illustrated in FIG. 2 for clarity; however, it should be understood that the housing can be configured to attach to the inside portion of the freezer door 108 and to securely support frozen ingredient containers 1-6 and additional components as described herein. In general, frozen ingredient containers 1-6 can be configured such that they can receive and store an amount of selected ingredients, e.g., foods that, to maintain freshness are best kept in a freezer and can also include re-sealable tops, doors, lids or other mechanisms to store foods therewithin.

In this embodiment, one of the frozen ingredient containers, e.g., frozen ingredient container 1, is configured to receive and store ice from an ice maker IM disposed within the freezer 108a. Ingredient containers, e.g., ingredient containers 1-6 and 7-10 (described below) can store ingredients in bulk, or, in certain embodiments, pre-proportioned ingredients for making a beverage according to a recipe. For example, the containers 1-6, 7-10 can individually contain pre-proportioned smoothie ingredients to make smoothies of different flavors or types; e.g., container 1 can contain ice, and container 2 can contain a mixture of frozen strawberries, bananas, and flavorings to make a strawberry-banana smoothie. Likewise, container 2 may contain frozen strawberries, sugar, rum, and lime juice for making a strawberry daiquiri. In another approach, each container can store individual ingredients that can be blended together to make a smoothie drink; e.g., container 1 can contain ice; container 2 can contain frozen yogurt; container 3 can contain frozen bananas; container 4 can contain strawberries, and so on. It should be understood that pre-proportioned ingredients of practically any type can be stored within any of containers 1-10 for making a selected beverage; likewise, any of the pre-proportioned ingredients can be combined with water, ice or other ingredients according to a given recipe.

In this embodiment, a controllable, motorized dispenser assembly 160 is coupled to each ingredient container. Each dispenser assembly 160 is configured to dispense ingredients stored within its respective ingredient container into chute 150, each of which leads to a freezer-to-refrigerator aperture 145. In this embodiment, freezer-to-refrigerator aperture 145 is configured to allow the various ingredients dispensed from containers 1-6 to pass from the freezer section to the refrigerator section. Because each of the freezer and refrigerator doors can open and close as usual, aperture 145 may be formed of sections which are joined by one or more substantially leak-proof seal assemblies (not illustrated in FIG. 2) that traverse the freezer and refrigerator sections.

In this and other embodiments, each motorized dispenser assembly 160 can be, e.g., a mechanized trap-door assembly, a grinder, a shredder, a hopper, a dry or liquid food dispenser or any other mechanism capable of dispensing the contents of the ingredient container into conduit 150. In one embodiment, the motorized dispenser assembly is capable of dispensing a pre-determined portion of the ingredient stored in the container to which it is coupled, so that, for example, ingredients can be dispensed according to a recipe. Each motorized dispenser assembly 160 can be individually controllable by a control module of on-board communications hub 180 via, e.g., wiring (not shown in FIGS. 1-2A) leading from the communications hub 180 to motorized dispenser assembly 160.

In this embodiment, the BSA 105 includes a plurality of ingredient containers 7-10 disposed within an interior housing of refrigerator door 109 for storing ingredients that are best kept in a refrigerated section of the BSA 105. Exemplary, non-limiting ingredients of such type include water, milk, alcohol, spirits and other ingredients. The interior housing is not illustrated in FIGS. 1-2 for clarity; however, it should be understood that the housing can be configured attach to the inside portion of the freezer door 108 and to securely support ingredient containers 7-10 and additional components described herein.

In this embodiment, each of the ingredient containers 7-10 includes a dispenser assembly 160 coupled thereto which is configured and operable to transport a desired amount of ingredient to blender 170 via a dedicated conduit (collectively labeled as 155 in FIGS. 1-2). The conduits 155 can be, e.g., food-grade flexible vinyl or PVC tubing. As with ingredient containers 1-6, each of the ingredient containers 7-10 can be individually controllable to dispense a pre-defined amount of ingredient to blender 170.

In this embodiment, communications hub 180 is configured to send control signals to each motorized dispenser assembly (e.g., assembly 160) associated with each ingredient container 1-6, 7-10, the ice dispensing assembly IM and any other optional components of the BSA 105. Communications hub 180 is further configured to control blender 170 to activate it for a predetermined amount of time sufficient to blend the various ingredients disposed therein. Communications hub 180 is furthermore yet configured to control an optional cup dispenser assembly (not illustrated in FIGS. 1-2) which can be configured to shift one of a plurality of cups from a cup storage area to the dispenser housing 115 prior to blending of the ingredients.

In this embodiment, blender 170 is configured to receive frozen ingredients from aperture 145 after traveling through chute 150 and also ingredients stored within the refrigerator section 109a. In this embodiment, blender 170 is configured to rotate between three primary positions: an ingredient-receiving and blending position; a dispensing position; and a washing position. Blender 170 is illustrated in the ingredient-receiving position in FIGS. 1-2, with top blender portion 170a oriented upward. At the appropriate time, e.g., after receiving all ingredients, blender 170 can activate and blend the ingredients for a preset period of time. Subsequently, blender 170 can rotate (in this example, counterclockwise) to pour the blended mixture into a cup disposed in dispenser housing 115. In a preferred embodiment, an electric eye or other, similar device can confirm the presence of a cup within dispenser housing 115 prior to the blender 170 rotating into the dispensing position to reduce the likelihood of spills.

In this embodiment, after dispensing the blended mixture, the blender 170 can rotate to the washing position. In this embodiment, BSA 105 is configured to perform at least one of rinsing, washing or sanitizing of the blender 170. The rinsing, washing or sanitizing can be performed automatically after preparation of a smoothie or at set intervals, or a combination thereof. In this embodiment, BSA 105 includes a nozzle 172 that is plumbed to a water source—preferably a hot water source—and, optionally, a source of soap or sanitizer, and is further configured to spray the water and/or a soap/sanitizer solution into blender 170. In one embodiment, BSA 105 can include a water heater unit configured to heat a washing volume of water to a preferred temperature; preferably the water can be heated to a sterilizing temperature. When blender 170 rotates to the washing position, the top (170a) portion of the blender 170 points toward nozzle 172. During a wash/rinse cycle, the rinse solution is collected in catch basin 174 which is plumbed to a drain via tubes 176 and 178. In this embodiment, to allow for the refrigerator door 109 to be opened and closed, tubes 176 and 178 can be reversibly couplable such that the tubes form a leak-proof union when the refrigerator door 109 is in a closed position.

In this embodiment, reservoir W can retain a volume of soap or sanitizing solution. After a smoothie product is made, blender 170 can rotate back to the blending position to receive a volume of the soap or sanitizing solution. Optionally, the blender can be activated to assist in cleaning the blender blades and interior surfaces. Subsequently, the blender 170 can be rotated to the washing position to be rinsed by a spray originating from nozzle 172. It should be understood that any combination of blender 170 positions and wash/rinse/sanitize steps can be performed to achieve optimal cleanliness.

Figure 2B:
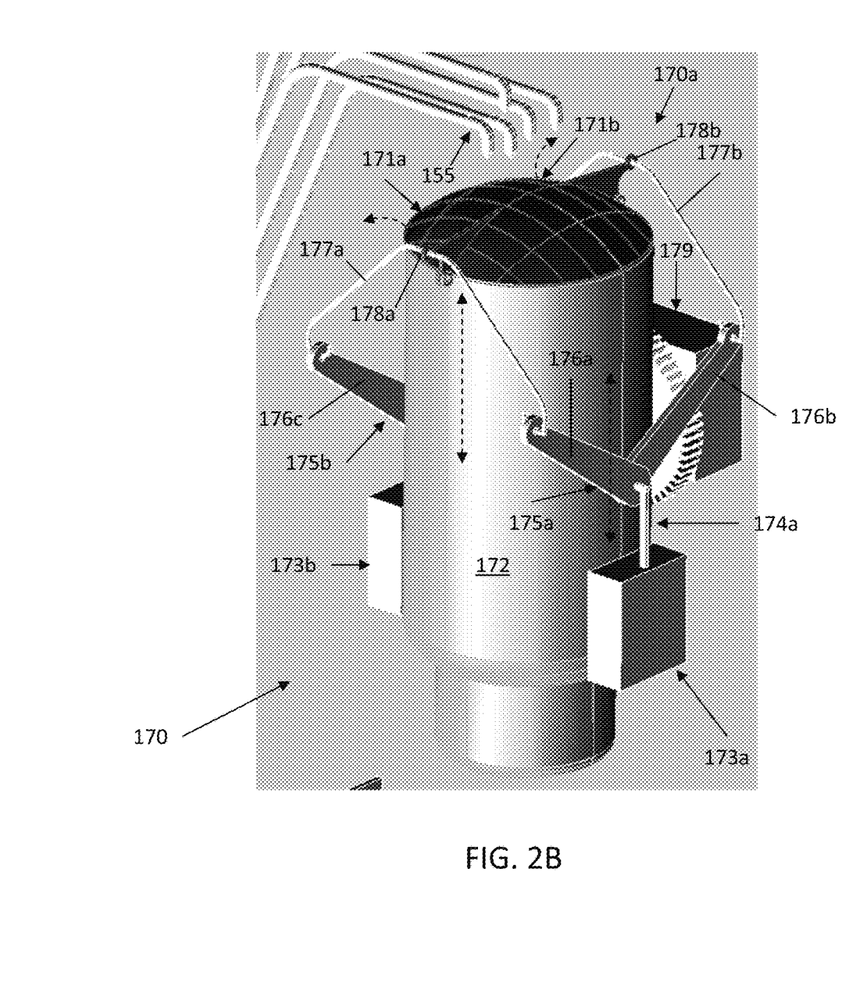
FIG. 2B illustrates a blender, according to one embodiment.

Referring now to FIG. 2B, a magnified view of blender 170 is illustrated. In this embodiment, blender 170 has a top portion 170a configured to be mechanistically opened and closed for receiving smoothie ingredients and blending them, respectively. In this embodiment, top portion 170a includes first and second door portions 171a, 171b hingedly coupled to the cylindrical main body 172 of blender 170. Servo motors 173a, 173b are disposed on diametrically opposite sides of main body 172 and are configured to drive arms 174a, 174b up and down as illustrated by the dashed arrow. (Arm 174b is not illustrated in FIG. 2B for figure clarity but is configured similarly to arm 174a.)

In this embodiment, scissor arm assemblies 175a, 175b each include two hingedly coupled scissor arms 176a, 176b, 176c and 176d as illustrated. (A full view of scissor arm assembly 175b is not shown for figure clarity but is configured similarly to scissor arm assembly 175a; scissor arm 176d is similarly not illustrated for figure clarity.) In this embodiment, arm 174a bisects the two scissor arms 176a, 176b where they are hingedly coupled, as illustrated. Bales 177a, 177b are coupled to scissor arms of opposite scissor arm assemblies and extend through door flanges 178a, 178b, respectively, as illustrated. For example, bale 177a is coupled to an end portion of scissor arm 176a of scissor assembly 175a, passes through door flange 178a and is coupled on an opposite end to scissor arm 176c of scissor assembly 175b.

In this embodiment, when servo motors 173a, 173b drive arms 174a, 174b upward (white dashed arrow), scissor arms 176a, 176b, 176c and 176d are concurrently urged upward at the points where they are coupled, respectively. This action drives the distal end portions of scissor arms 176a, 176b, 176c and 176d, and thereby, bales 177a, 177b downward (black dashed arrow) which engenders hinged door portions 171a, 171b to open (curved black dashed arrows). Hinged door portions 171a, 171b can be closed by a reverse sequence engendered by servo motors 173a, 173b shifting arms 174a, 174b downward.

Motorized gear assembly 179 can be coupled to blender 170 to provide rotation of the entire blender 170 assembly into the blending, dispensing and washing positions as previously described. Servo motors 173a, 173b can be configured to open and close doors 171a, 171b when appropriate; for example, the doors 171a, 171b can be opened to receive ingredients, closed when blending, and opened for dispensing and washing/rinsing.

Figure 3:
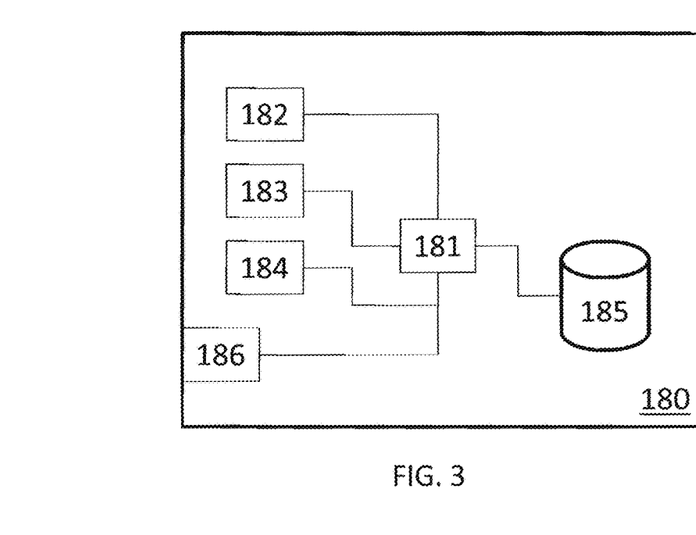
FIG. 3 illustrates components of a communications hub according to one embodiment.

Referring now to FIG. 3, select modules of the communications hub 180 are illustrated according to one embodiment. It should be understood that the modules discussed here are those that can enable the SMS 100 to function as described but that other modules can be integrated to achieve additional desired functionality. In general, communications hub 180 is configured and operable to send and receive command, control, information and other signals through network 101, which provides, inter alia, command and control signals to be received from a remote device to cause mixed beverages such as smoothies to be created on-demand or at a scheduled time in the future.

In this embodiment, communications hub 180 includes processor 181 which is operable to carry out command and control functions as described herein according to stored logic. Processor 181 is in signal communication with memory 182, which can be any type of computer memory, e.g., RAM, ROM, cache or other types. Data repository 185 can include stored logic, instructions and other data which processor 181 can execute to cause appropriate control signals to be generated for actuating the various mechanized controls discussed herein, e.g., rotation of blender 170, opening and closing of blender doors 171a/171b via servos 173a/173b, activation of each motorized dispenser assembly 160 operably coupled with each of the ingredient containers, e.g., containers 1-6, 7-10, activation of one or more pumps to spray washing/sanitizing solution into blender 170 via nozzle 172 and other functions. While not illustrated in the figures for sake of clarity, it should be understood that communications hub 180 can include as many output registers as necessary to provide signal communication between the various electronic components of the BSA 105 and processor 181, so that communications hub 180 can control the various functions of the BSA 105. Furthermore, data repository 185 can include stored, executable instructions for authenticating a user control signal sent by mobile device 110; as such, the mobile control application described below can include the ability to create a secured user account that can be paired with a particular communications hub 180. Authentication module 183 can process received control signals and perform authentication measures to ensure that the SMS is being controlled by an authorized user.

Scheduling module 184 can include executable instructions for receiving and processing control signals for making smoothies according to a scheduled start time. For example, a user can use the mobile control application to schedule a smoothie to be made, according to a preferred recipe at a certain selected date and time. These instructions can be sent from mobile device 110 via network 101 to the communications hub 180; the scheduling module 184 can receive those instructions and schedule their execution according to the selected date and time input by the user.

In one embodiment, scheduling module 184 can be configured to provide an alarm clock-type interface, e.g., on a mobile device. In such an embodiment, the scheduling module 184 can be programmed to produce a voice output at a selected time, e.g., a wake-up time, which prompts the user as to whether they would like a smoothie to be made for them. For example, a wake-up prompt can annunciate: "Good morning. It is seven o'clock. Would you like your strawberry-banana smoothie made?" The alarm clock-type interface can include one or more action items, e.g., a confirmation button that, when pressed sends a confirmatory signal to processor 181. In response to such a signal, the processor 181 can execute logic instructions for preparing the user's smoothie as commanded. The alarm clock-type interface can include, e.g., common alarm clock features, such as a 'snooze' command which delays the smoothie making process for a selected time, or a cancel command, which cancels a smoothie making process, etc.

Input/Output (I/O) module 186 can include input and output registers configured for receiving and transmitting command and control signals. In this example, wireless signals can be received by antenna 107 which is in signal communication with I/O module 186. Signal communications can be transmitted via near field communication ("NFC"), BLUETOOTH, Wi-Fi, infrared, or any other suitable communication technology. I/O module 186 can perform any necessary signal filtering, conversion or other manipulation prior to being passed to processor 181. Similarly, after receiving a signal from processor 181, the I/O module 186 can perform any necessary signal filtering, conversion or other manipulation prior to sending that signal to the appropriate control mechanism. Furthermore, the SMS 100 can be configured with sensors operable to detect an ingredient and an ingredient level within each ingredient container. If an ingredient level falls below a certain threshold value, an alert signal can be sent from the sensor to the communications hub 180 which can be received by I/O module 186. Subsequently, the communications hub 180 can generate a signal to be sent to mobile device 110, e.g., an email, text message or application alert for notifying the user that the ingredient level is low.

Figure 4:
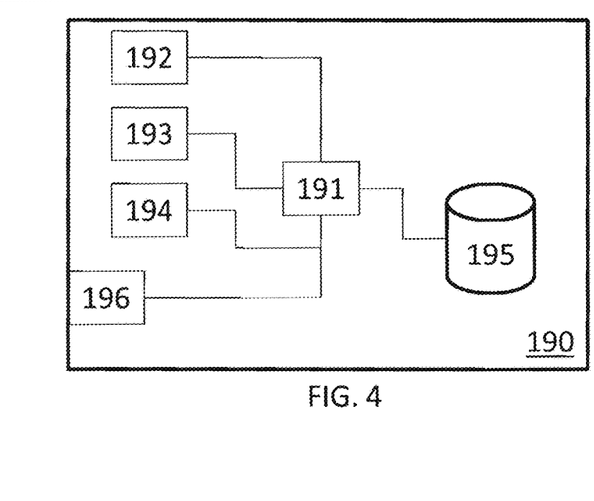
FIG. 4 illustrates components of a mobile application for controlling an automated mixed-beverage dispensing system according to one embodiment.

Referring now to FIG. 9, components of a mobile control application (hereinafter 'application') 190 are illustrated according to one embodiment. In general, the application 190 can be configured to run on various mobile devices available in the art, e.g., mobile phones, personal data assistants (PDAs), laptop and desktop computers, tablets, devices sold under the iPad and iPod brands provided by Apple, Inc., Cupertino, Calif., USA; Android devices provided by Google, Inc., Mountain View, Calif., USA; and other devices. An exemplary device is described in US Application Publication No. US20140058901 to Google, Inc., in particular the description corresponding to FIG. 5 and "computing device 2000" which is incorporated herein by reference for the purpose of describing a suitable mobile device 110 for use with SMS 100.

In this embodiment, application 190 includes a main control module 191 which sends and receives data to/from other modules of the application 190 and is configured to carry out functions for providing a user interface to the SMS 100. In this embodiment, a display module 192 includes instructions for outputting user-selectable interface elements, e.g., select and action buttons and the like, receiving user input data, and other similar functions.

In this embodiment, a user account manager module 193 includes instructions for creating a user account within the application, pairing the user account with a particular communications hub 180, and communicating with a communications hub for the purpose of user authentication. In one example, communications hub can include a media access control (MAC) address which can be a unique code that is paired with a specific user account. In another example, which can be combined with the previous example, communications hub 180 can be assigned a unique IP address which can be used for the same or similar purpose.

In this embodiment, a user preferences module 194 provides the capability for a user to store and retrieve smoothie (or other beverage) recipes from data repository 195 utilizing the application interface 125. For example, a user can store one or more recipes which, when selected, can be transmitted to communications hub 180 so that a smoothie can be made according to the proportions of ingredients in the recipe.

In this embodiment, I/O module 196 is configured to provide bi-directional signal communication between the application 190 and communications hub 180. In general, communications hub 180 can be configured to create a smoothie drink according to instructions—e.g., a recipe—received by application 190. For example, a recipe may call for one part ice, one part of a first ingredient, two parts of a second ingredient and three parts water. Repository 185 can store necessary control signal parameters to cause the mechanized components of BSA 105, e.g., each motorized dispenser assembly 160, to actuate according to the parameters of the recipe, including any conversion tables that may be required. For example, one "part" of the first ingredient can be dispensed according to a stored instruction that causes motorized dispenser assembly 160 to actuate for 10 seconds, or two revolutions or any other parameter applicable to the type of dispenser assembly being used. Likewise, two "parts" of water may correspond to, e.g., actuating valve motorized dispenser assembly 160 on ingredient container 9 for a period of three seconds, and so on.

Thus, a BSA 105 can include any desired number of ingredient containers storing various ingredients therein, and the communications hub 180 can be programmed with logic instructions capable of dispensing those ingredients according to a given recipe.

In general, the SMS 100 is capable of storing recipe instructions and executing those instructions at a given time according to a user-defined schedule. For example, a user may wish to have a smoothie when they wake up in the morning; accordingly, the user can, through the application interface, send the desired recipe along with a defined execution date and time to the communications hub so that the smoothie will be prepared for them at their desired time. In another example, a person commuting home may wish to have a smoothie upon arrival, and so may transmit a selected recipe to be prepared in 10 minutes, 20 minutes, etc.

In one embodiment, each ingredient container can be configured to automatically detect ingredients stored therein. In one example, each ingredient container can include an optical sensor, and pre-packaged ingredient pouches can include a barcode or QR code readable by the optical sensor. The barcode or QR code can encode various types of ingredient information, e.g., "20 ounces of organic strawberries," or "Rum." In use, a user can hold the pouch in proximity to the sensor until it has been read, and then place the ingredients within the container. In another example, each ingredient container can be configured with an NFC reader and various ingredients can be packaged with a unique NFC tag that identifies the product. Other types of wireless data exchange can be used in similar ways, including, e.g., RFID readers and tags.

A number of illustrative embodiments have been described. Nevertheless, it will be understood that various modifications may be made without departing from the spirit and scope of the various embodiments presented herein. For example, ingredients that can be stored within freezer ingredient containers (e.g., containers 2-6) include, without limitation: Raspberries, blueberries, strawberries, pineapple, mango, bananas, acia berries, kiwi fruit and yogurt. Similarly, ingredients that can be stored within refrigerator ingredient containers (e.g., containers 7-10) include, without limitation: liquid ingredients such as apple juice, orange juice, grapefruit juice, almond milk, coconut water, wheat grass solution and liquid essential fatty acids; and non-liquid ingredients such as spinach, ginger, protein powders, blue-green algae powders, nuts, seeds and honey. In one embodiment, a cleaning cycle can include dispensing water into the blender absent of any other ingredients. The BSA 105 can include dispensable detergents or other cleaning agents that can be used in an automated cleaning process to keep the blender clean. The SMS 100 can include various programmed safety and spill-prevention measures. For example, a spill-prevention measure can include ensuring that a total smoothie volume does not exceed a maximum threshold value, even if the proportions of a particular recipe call for amounts that would exceed the maximum threshold value. Refrigerator and freezer doors 109, 108 can be configured with interlock sensors that prohibit smoothies from being made if the doors are not completely closed. Programmatic interlocks can similarly deny the making of a smoothie product if one of the ingredient containers is empty or below a predetermined volume. The various components described herein for making smoothies and other blended beverages can be sized to allow them to be integrated into commercially-available freezer/refrigerator systems, leaving ample space to store other food products. Accordingly, other embodiments are within the scope of the following claims.

What is claimed is:

1. An automated beverage-making system, comprising:
   a partition disposed between an upper freezer section and a lower refrigerator section, the partition comprising an aperture;
   at least one ingredient container for storing one or more ingredients disposed within said freezer section, each ingredient container comprising an actuatable ingredient dispenser configured to dispense a quantity of said one or more ingredients; and
   a blender disposed within said refrigerator section configured to receive said one or more ingredients, blend said one or more ingredients to form a drink mixture, and dispense said drink mixture into a drinking container.

2. The automated beverage-making system of claim 1, wherein said at least one ingredient container is configured to dispense said one or more ingredients through said aperture in said partition.

3. The automated beverage-making system of claim 1, wherein said freezer section comprises a plurality of said ingredient dispensers configured to store frozen food ingredients.

4. The automated beverage-making system of claim 3, further comprising a chute assembly configured to transport said one or more ingredients dispensed from any of said ingredient dispensers to said aperture in said partition.

5. The automated beverage-making system of claim 1, further comprising:
   one or more ingredient containers disposed in said refrigerator section, each having an ingredient dispenser operably coupled thereto to dispense a quantity of said ingredient; and
   an ingredient conduit configured to carry said dispensed quantity of said ingredient to said blender.

6. The automated beverage-making system of claim 1, further comprising a communications hub, said communications hub comprising at least a processor and a memory configured to control said actuatable ingredient dispenser according to stored logic instructions.

7. The automated beverage-making system of claim 6, wherein said communications hub is configured to receive command and control signals from a remote computing device for creating said drink mixture according to a recipe.

8. The automated beverage-making system of claim 6, wherein said quantity of said ingredient is dispensed according to a pre-defined drink mixture recipe.

9. The automated beverage-making system of claim 1, wherein said blender is rotatable about an axis between an ingredient-filling position, a dispensing position and a washing position.

10. The automated beverage-making system of claim 9, further comprising a nozzle assembly plumbed to a wash solution and a catch basin plumbed to a drain, wherein, when said blender is in said washing position, said nozzle assembly is configured to spray said wash solution into said blender, and said catch basin is configured to catch the discard.

11. The automated beverage-making system of claim 1, wherein said blender comprises a top portion, said top portion comprising at least one hingedly-coupled door member configured to shift between open-blender and closed-blender configurations.

12. The automated beverage-making system of claim 11, further comprising:
 a shaft member configured to be shifted between extended and retracted positions;
 a hingedly-coupled scissor-arm assembly coupled to said shaft member; and
 a bale member coupled to said scissor-arm assembly and a flange member of said door member.

13. The automated beverage-making system of claim 12, wherein said blender top portion comprises a plurality of hingedly-coupled door members.

14. The automated beverage-making system of claim 12, wherein shifting of said shaft in an upward direction causes opposite ends of said scissor-arm assembly to correspondingly shift downward, which correspondingly urges said door member to shift to said open-blender configuration.

15. The automated beverage-making system of claim 1, wherein said at least one ingredient container of said freezer section is disposed on a door of said freezer section.

16. The automated beverage-making system of claim 15, wherein said blender is disposed on a door of said refrigerator section.

17. An automated smoothie-making machine, comprising:
 at least one ingredient container for storing one or more ingredients in each of a freezer section and a refrigerator section, each ingredient container having a dispensing assembly for dispensing a selected amount of each ingredient container's ingredients, respectively; and
 means for combining dispensed ingredients from said freezer section and said refrigerator section into a blender to form a smoothie drink product.

18. The automated smoothie-making machine of claim 17, further comprising:
 means for automatically washing the interior portion of said blender after a smoothie drink product has been made.

19. The automated smoothie-making machine of claim 18, further comprising:
 means for mechanistically opening and closing first and second doors hingedly disposed on a top portion of said blender.

20. An automated smoothie-making system, comprising:
 a partition disposed between an upper freezer portion and a lower refrigerator portion, said partition comprising an aperture;
 a plurality of ingredient containers for storing smoothie ingredients disposed within said freezer and said refrigerator portions; and
 a blender disposed subjacent to said aperture configured to blend said smoothie ingredients into a smoothie drink mixture;
 wherein each of said ingredient containers in said freezer section is configured to dispense ingredients into a collection chute leading to said aperture;
 wherein a top portion of said blender comprises a plurality of door members operably configured to shift between open and closed positions to receive and blend said ingredients, respectively; and
 wherein said blender is configured to rotate between ingredient-receiving and blending, smoothie drink mixture dispensing and blender washing orientations.

\* \* \* \* \*